United States Patent [19]

Meyer et al.

[11] Patent Number: 6,069,918
[45] Date of Patent: May 30, 2000

[54] METHOD OF DETECTING MOVING OBJECTS IN CHRONOLOGICALLY SUCCESSIVE IMAGES

[75] Inventors: Michael Meyer, Sibbesse; Michael Hoetter, Gehrden; Frank Rottmann, München, all of Germany

[73] Assignee: Robert Bosch GmbH, Stuttgart, Germany

[21] Appl. No.: 08/913,892

[22] PCT Filed: Oct. 26, 1996

[86] PCT No.: PCT/DE96/02046

§ 371 Date: Sep. 11, 1997

§ 102(e) Date: Sep. 11, 1997

[87] PCT Pub. No.: WO97/26622

PCT Pub. Date: Jul. 24, 1997

[30] Foreign Application Priority Data

Jan. 15, 1996 [DE] Germany .......................... 196 01 005

[51] Int. Cl.[7] .................................................... H04N 7/18
[52] U.S. Cl. .............. 375/240; 375/240.17; 375/240.18; 348/699; 348/700; 348/412; 348/413; 348/415
[58] Field of Search .................................. 348/169, 172, 348/700, 699, 170, 416, 415, 412, 413; 375/240.17, 240.18, 240.9

[56] References Cited

U.S. PATENT DOCUMENTS

| | | | |
|---|---|---|---|
| 4,737,847 | 4/1988 | Araki et al. .............................. | 348/161 |
| 5,034,986 | 7/1991 | Karmann et al. ........................ | 382/103 |
| 5,103,305 | 4/1992 | Watanabe ................. | 382/236 |
| 5,243,418 | 9/1993 | Kuno et al. .............................. | 348/155 |
| 5,654,772 | 8/1997 | Mester et al. ........................... | 348/700 |
| 5,666,157 | 9/1997 | Aviv et al. ............................... | 348/152 |
| 5,764,283 | 6/1998 | Pingali et al. ........................... | 348/169 |
| 5,812,193 | 9/1998 | Tomitaka et al. ....................... | 348/169 |

*Primary Examiner*—Andy Rao
*Attorney, Agent, or Firm*—Michael J. Striker

[57] ABSTRACT

A method for detecting moved objects in chronologically successive pictures is disclosed in which a current picture is divided into picture blocks and in each picture block a change of a picture signal of the current picture from that of a corresponding picture block of a first reference picture preceding the current picture is as certained , To detect the change the difference between the picture signals of the current picture and tho se of a second reference picture without moved objects is first compared pixel-precisely with a first threshold. If the first threshold is exceed, an object-oriented analysis of object size and/or shape takes place in which the picture signals corresponding to the moved object are compared with picture signals of a corresponding region of the first reference picture. For at least one moved object of the current picture that undershoots a size threshold, a motion vector is estimated. If the magnitude of the estimated motion vector exceeds a second threshold, the associated object is monitored chronologically and if a third threshold is exceed, then the object is immediately detected as a moved object. For the chronologically monitored objects, based on a third reference picture corresponding to a previous current picture object motion is estimated to predict a new object position in the current picture.

19 Claims, 5 Drawing Sheets

METHOD OF DETECTING MOVING OBJECTS IN CHRONOLOGICALLY SUCCESSIVE IMAGES

BACKGROUND OF THE INVENTION

1. Field of the Invention

The invention is based on a method for detecting moved objects in chronologically successive pictures and, more particularly, to a method for detecting moved objects in chronologically successive pictures in which a current picture is divided into picture blocks for block-oriented analysis, a picture signal of a current picture is compared with a picture signal of a corresponding picture block of a first reference picture that precedes the current picture in the chronological succession of pictures and a textural and/or picture signal change is ascertained.

2. Prior Art

From German Patent Application P 44 40 671, which had not yet been published by the priority date of the present application, a method for optical detection of moved objects is already described. To ascertain a moved object, in the known method a current picture is compared with a reference picture with regard to the measurement variables of changes in picture signal, texture, and displacement. If a moved object is detected, then next an object-oriented analysis of the moved objects is carried out, by means of a pixel-precise detection of change with reference to a background picture. Next, in an object mask, the picture regions that belong to the moved object and are coherent are characterized. Based on a concluding examination of topology on the basis of the characteristics, size and linearity and an examination of the object-oriented measurement variables of changes in picture signal, texture, and motion, a moved object is detected.

SUMMARY OF THE INVENTION

The method of the invention has the advantage over the prior art that object characteristics for and object are ascertained an evaluated not merely at one instant but rather that a chronological succession of characteristics is ascertained and evaluated. As a result, it is possible to discriminate among objects that move only briefly and over a short distance, and objects that move continuously over greater distances. For instance, it is possible to distinguish between persons, who move in an oriented way through a scene being photographed, and regions containing trees, which move in the wind over only slight distances. In this way, the stability of the object detection method is increased, on the basis of improved discrimination between useful variables and interference variables.

By the provisions recited in the dependent claims, advantageous further features of and improvements to the method defined by the main claim are possible.

In one advantageous preferred embodiment of the invention the object motion is ascertained as a function of time by adding together previous motion vectors. As a result, in addition to the information that a moved object is moving in an oriented way through an observed scene, accurate information is gained about the course of the object through the picture-taking situation, in the form of a vector chain. In this way, the evaluation of an alarm is improved substantially.

In another preferred embodiment of the invention the object-oriented analysis is limited to those picture regions in which moved objects have been found by the block-oriented analysis or in which objects have been predicted by motion estimation. In this way, an analysis is performed only in those picture regions that are effected by object motion, thus saving effort and time for computation.

In a further preferred embodiment of the invention the mean object-oriented textural change over time is included in evaluating the necessity of whether or not to monitor an object. In this way, one additional characteristic for assessing the behavior of an object over time is available, thus further improving discrimination between useful variables and interference variables.

The use of block-oriented analysis of the textural changes to determine the mean object-oriented textural change over time is particularly advantageous. This substantially lessens the additional effort involved in determining the mean object-oriented textural change over time.

The discontinuance of monitoring of the object if the amount of the added-together motion vector exceeds the predetermined second threshold is particularly advantageous. As a result, objects whose motion is not of interest, such as a tree branch moving back and forth, are distinguished from objects of interest that have an oriented motion, and at the same time effort is saved, since fewer objects have to be monitored.

In one preferred embodiment a monitored object is reported or detected in the form of a moved object, if it was not possible to ascertain a motion vector in the most recently performed motion estimation, or if no association of the monitored object with an object of the current picture is possible. In this way, the motion of objects that is no longer detectable, for instance because of the limited picture taking frequency, is nevertheless recognized.

It is advantageous in a particularly preferred embodiment of the invention prior to a more-precise object-oriented analysis, to compare the objects with regard to their size and shape with predetermined sizes and predetermined shapes, and not to carry out any further comparison of the picture signals of the objects if the size of the objects or the shapes of the objects do not correspond to the predetermined sizes or shapes. In this way, the efficiency of the method is improved.

In a preferred embodiment of the method an alarm is tripped when an object is detected as a moving object. As a result, the method can be employed in alarm systems.

In another embodiment of the method of the invention when an object is detected as a moving object, its monitoring is discontinued. As a result, effort, time and memory space can be saved for monitoring objects not yet detected as being in motion.

In a particularly preferred embodiment of the method according to the invention the motion estimation is assessed by means of a quality criterion. As a result, objects with an unreliable motion estimate can be characterized and monitored particularly. This plays a role above all when the unreliability of the estimate is due to the fact that the object has left the picture-taking situation, or its motion is not detectable because of the limited picture-taking frequency. In such cases, an object alarm can be issued as a precaution.

In one embodiment of the method according to the invention the motion of an object is efficiently calculated from the displacement of the object using the pixels contained in an object mask.

The object mask is ascertained by means of the pixel-precise detection of change; every multiply coherent picture region detected as having changed is characterized with its own designation. This further simplifies the method of the invention.

In a preferred embodiment of the method the monitored object is correlated with an object in the current picture, by superimposing the object masks taking the predicted object motion into account and checking the overlap of the circumscribing rectangles.

In another preferred embodiment the size of the moved object is weighted as a function of the picture position. As a result, the scene can be assessed from the standpoint of perspective, and the threshold for object detection or an object alarm can be lowered for objects located farther away.

In a further preferred embodiment of the invention the second reference picture is tracked by overwriting it with the first reference picture if no object is being monitored, and if all the objects in the current picture have been detected as objects not in motion. In this way, simple updating of the second reference picture without moved objects can be achieved.

In an additional preferred embodiment of the method objects that are executing a slight motion are stored in a buffer memory and taken them into account in the first reference picture. In this way, very slight motions, which are cumulative, can be detected.

In an additional embodiment of the invention the first reference picture is overwritten with a subsequent current picture, if a moved object or an object characterized with an unreliable motion estimate is involved. This increases the picture taking frequency; so that correspondingly fast-moving objects also become detectable.

DRAWING

An exemplary embodiment of the invention is shown in the drawing and described in further detail in the ensuing description.

DESCRIPTION OF THE EXEMPLARY EMBODIMENT

Figure 1:
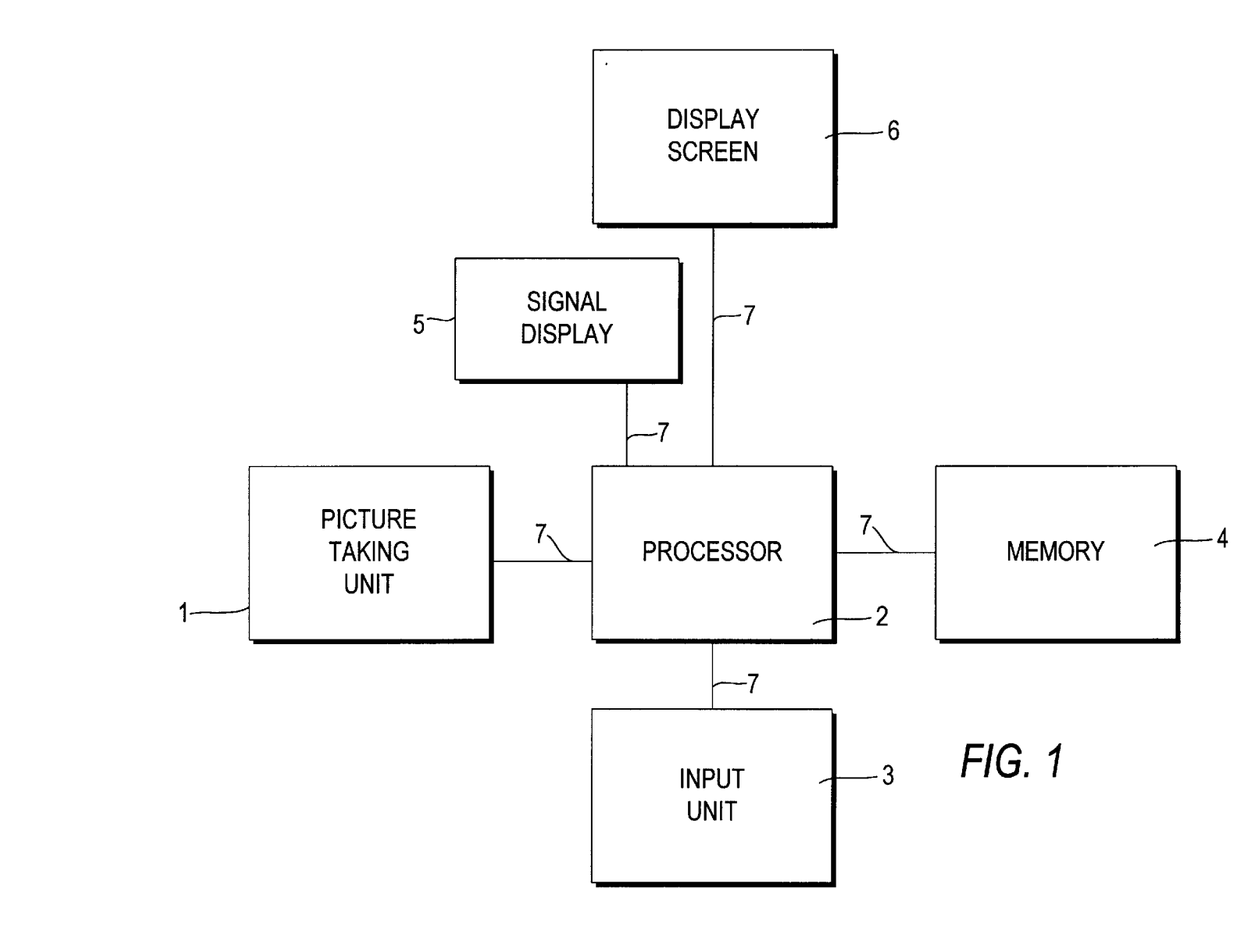
FIG. 1 shows an apparatus for performing the method.

FIG. 1 shows a picture-taking unit 1, which is connected via a data line 7 to an processor 2. The processor 2 is connected via a further data line 7 to a signal display 5. In addition, the processor 2 is connected to a memory 4 via still another data line 7. A screen 6 is also connected to the processor 2 via a further data line. FIG. 1 additionally shows an input unit 3, which is connected to the processor 2 via yet another data line 7.

Figure 2:
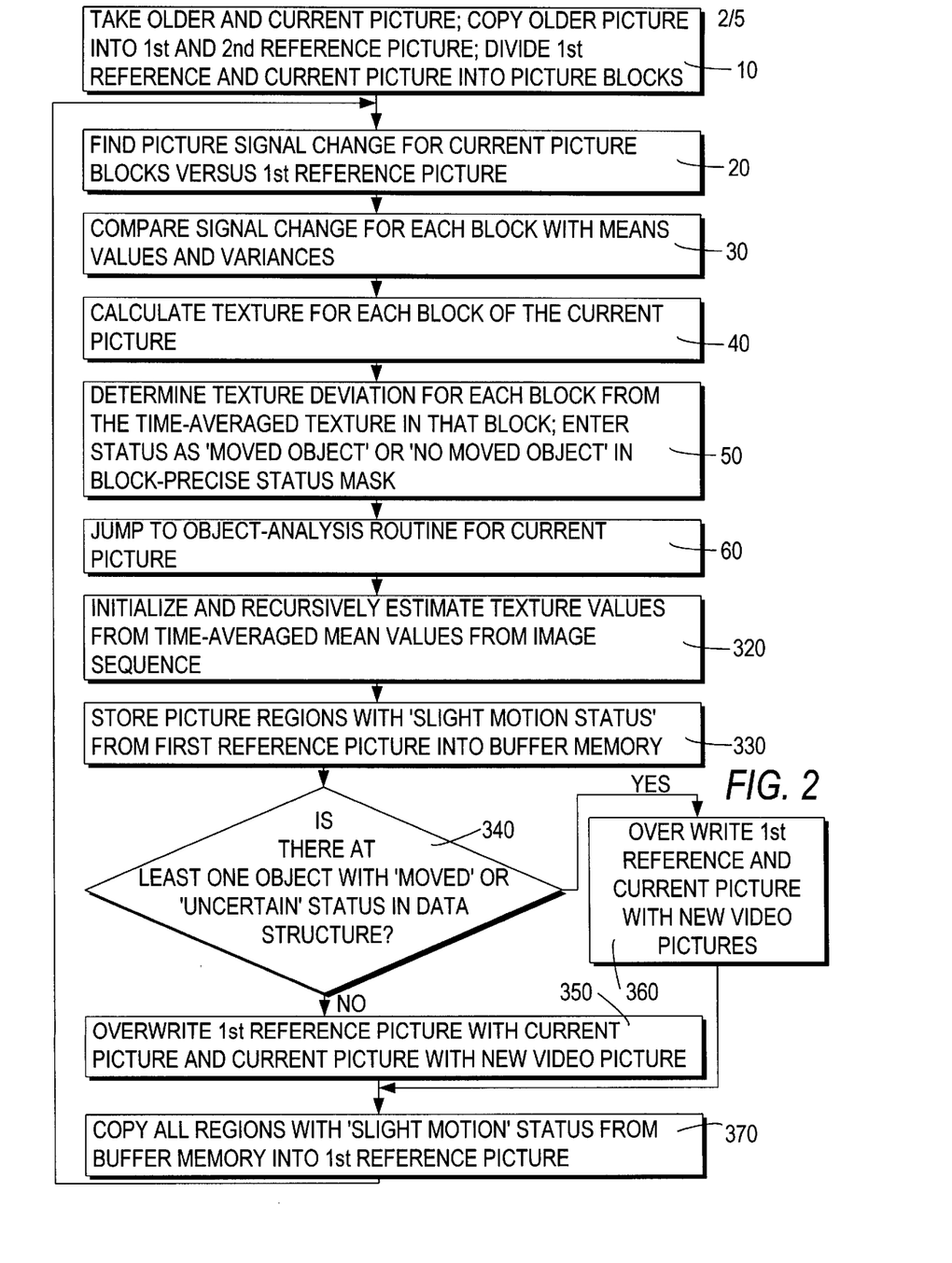
FIG. 2 is a schematic program flow chart.

FIG. 2 shows a schematic program sequence for performing the method for detecting moved objects in chronologically successive pictures. The corresponding program is stored in the memory 4 and is executed by the arithmetic unit 2.

At program point 10, the picture-taking unit 1 takes two chronologically successive pictures and sends them to the processor 2. The chronologically older picture is copied into a first reference picture. The chronologically older picture is also copied into a second reference picture, which represents the scene without moved objects. The chronologically more recent picture will hereinafter be called the current picture.

The processor 2 stores the current picture, the first reference picture and the second reference picture in the memory 4 and subdivides the current picture in the first reference picture into picture blocks. In this way, the entire current picture and the entire first reference picture are subdivided into equal-sized rectangular picture blocks. For example, picture blocks with a size of 10×10 pixels are used.

At program point 20, for each picture block of the current picture, the measurement variable represented by the picture signal change is calculated, by comparison with the corresponding picture block of the first reference picture. The thus-ascertained measurement variable is then compared at program point 30 with a chronological distribution function—described by mean value and variance. For each of the picture blocks, a picture signal change ratio $r_s$ between the previously ascertained picture signal change and a picture signal change typical for the picture block is determined by the method of the statistical significance test. The typical picture signal change for a picture block is initialized at the start of the method with a value corresponding to the noise in the picture-taking unit 1, which is preferably embodied as a camera and is estimated recursively from the image sequence at program point 320. For the picture blocks whose picture signal change ratio $r_s$ is greater than a picture signal change threshold $t_s$, the status "moved object" is entered in a block-precise status mask. For the other picture blocks, the status "no moved object" is entered into the block-precise status mask. The block-precise status mask is a binary mask, in which if the picture signal change threshold $t_s$ is exceeded, the corresponding picture block or the pixel of the picture block is occupied with a 1. If the picture signal change threshold $t_s$ is undershot, the corresponding picture block of the block-precise status mask is occupied with a zero.

At program point 40, the measurement variable of texture is calculated for each of the picture blocks in the current picture.

Figure 3:
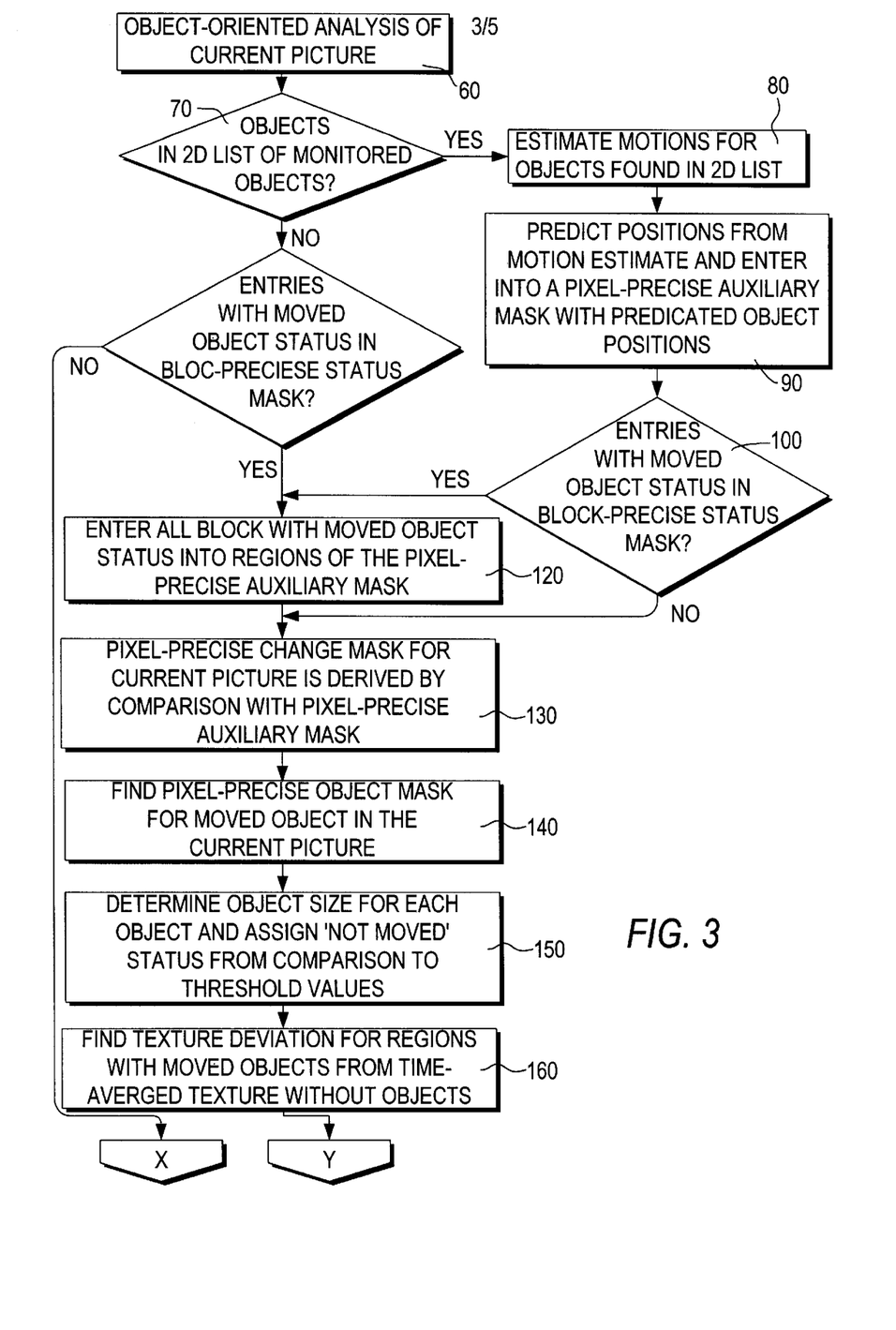
FIG. 3 and FIG. 4 each show a schematic program sequence for a subroutine for the object-oriented analysis.
Figure 4:
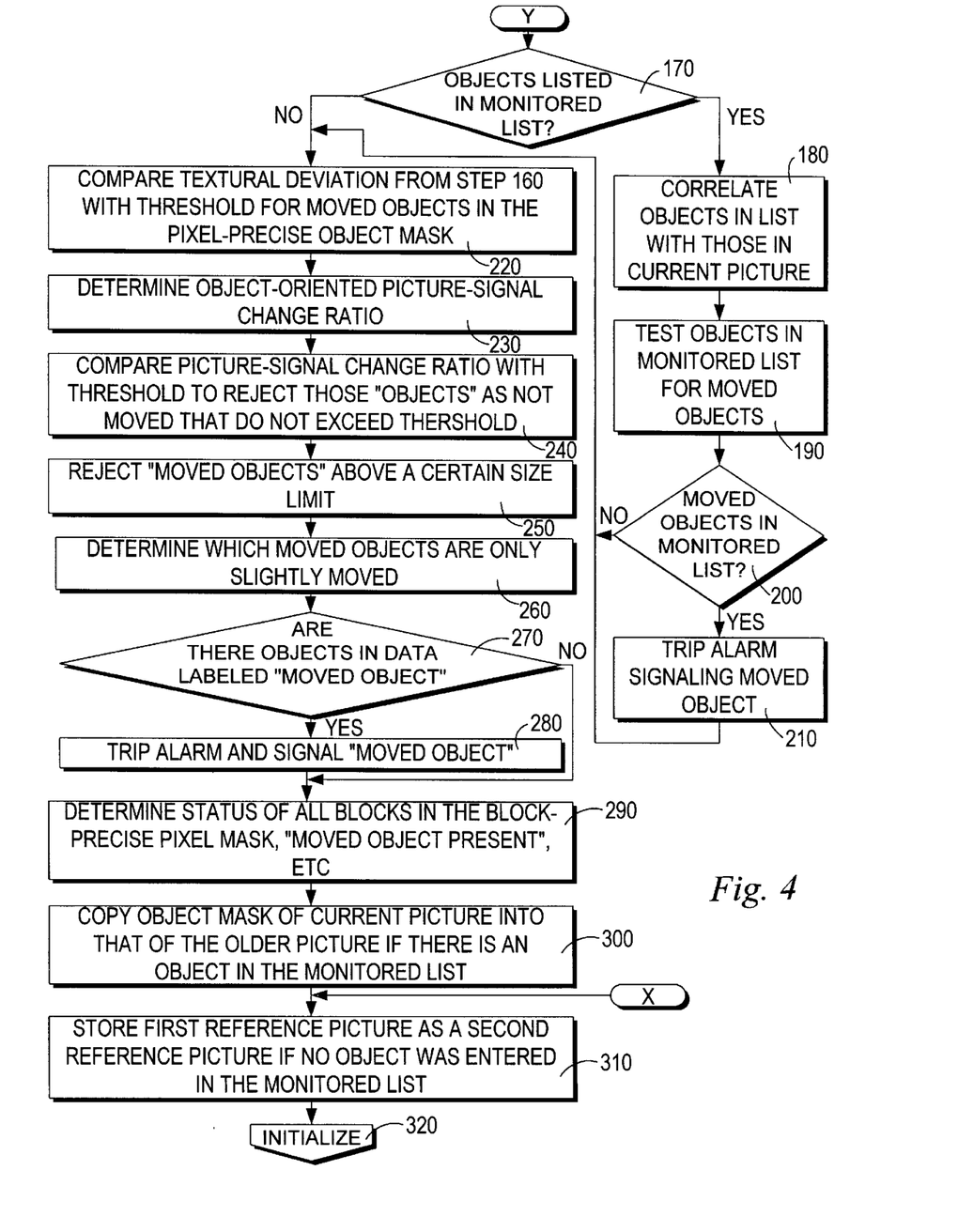

At program point 50, for each of the picture blocks, the deviation in the previously ascertained texture from the texture typical for that picture block, characterized by the mean value over time for the texture for the picture block in question, is ascertained, and a textural change ratio $r_t$ is determined between the previously ascertained textural change and a textural change typical for the picture block, characterized by the variance in the typical texture over time, the determination being done by the method of the statistical significance test. The values for the chronological mean value and the chronological variance in the texture are initialized at the beginning of the method using values from the first reference picture, taking camera noise into account, and are estimated recursively from the image sequence at program point 320. If the textural change ratio $r_t$ is below the textural change threshold $t_t$, and if the status "moved object" is entered in the block-precise status mask, then the status "no moved object" is entered in the block-precise status mask. After that, in the block-precise status mask for all the picture blocks in which the picture signal change ratio $r_s$ for the picture signal change and the textural change ratio $r_t$ for the textural change are above the corresponding change thresholds $t_s$ and $t_t$, the status entered is "moved object". For all the other picture blocks, the status entered is "no moved object". The status "moved object" continued to be equivalent to a picture block, designated by 1, of the block-precise status mask, and the status "no moved object" is equivalent to a picture block characterized by a zero in the block-precise status mask. At program point 60, a jump is made to a subroutine that enables an object-oriented analysis of the current picture, and whose program sequence is schematically shown in FIG. 3 and FIG. 4.

For chronologically monitoring objects, a two-dimensional list of the monitored objects is administered. One index of the two-dimensional list counts the number of monitored object, and the other index counts the number of pictures in which a monitored object has been segmented.

This two-dimensional list is initialized as empty at the beginning of the method.

At program point 70, it is asked whether objects have been entered in the two-dimensional list of monitored objects. If so, the method continues at program point 80, and if not it continues at program point 110.

At program point 80, a motion estimation is performed for all the objects in the two-dimensional list of monitored objects. The xn is done on the basis of a third reference picture, which corresponds to a previously used current picture, by predicting a new object position for the current picture; the starting object positions are to be taken from the object mask of the previously used current picture. At the beginning of the method, a third reference picture is not yet present, since there is no previously used current picture, and hence neither is there an associated object mask. Hence the motion estimation cannot be done at the beginning of the method, and anyway the two-dimensional list of monitored objects has been initialized as empty at the beginning of the method. For the motion estimation, a method is employed in which one quality criterion is ascertained for each possible motion vector within a search range, and the motion vector that best meets the quality criterion relative to the other possible motion vectors is assessed. If the quality criterion for the motion vector found to have the best quality criterion is markedly better met than by that for all the other possible motion vectors, then a reliable estimate is present. If not, the estimate should be assessed as unreliable. The outcome of the motion estimation is entered into the two-dimensional list of monitored objects.

At program point 90, for all the objects from the two-dimensional list of monitored objects for which a motion vector has previously been ascertainable, a new object position in the current picture is predicted, using this vector and the previous position in the object mask of the previously used current picture.

In subsequent program steps, object-oriented analyses are carried out. Preferably, the object-oriented analyses are performed only for those picture blocks in which a possible moved object has been detected. The corresponding picture blocks are characterized by ones (1s) in the block-precise status mask. The object-oriented analyses are also performed for the picture regions that are occupied by the predicted object positions.

Thus at program point 90, a pixel-precise auxiliary mask is generated, into which the predicted object positions are inserted in pixel-precise fashion.

At program point 100, the question is asked whether there are entries with the status "moved object" in the block-precise status mask. If so, the method continues at program point 120, and if not a jump is made to program point 130.

At program point 110, the question is also asked whether there are entries with the status "moved object" in the block-precise status mask. If so, the method continues at program point 120, and if not a jump is made to program point 310.

At program point 120, all the picture blocks that have the status of "moved object" in the block-precise status mask are entered in pixel-precise fashion into the corresponding regions of the pixel-precise auxiliary mask.

This means that in the pixel-precise auxiliary mask, all the pixels that are to be subjected to the object-oriented analyses are now characterized.

At program point 130, the picture signals of the current picture, in the picture regions to be analyzed in object-oriented fashion in accordance with the pixel-precise auxiliary mask, are compared pixel by pixel with the corresponding picture signals of the second reference picture, so that a pixel-precise change mask is ascertained. The pixel-precise change mask represents the moved objects. For ascertaining the pixel-precise change mask, the picture signal of each pixel of a picture block to be examined in the current picture is compared with the corresponding picture signal of the pixel of the second reference picture. The difference in picture signals is then compared with a predetermined first threshold. A pixel is characterized in the change mask if the corresponding difference in picture signals is above the predetermined first threshold. The predetermined first threshold may be adapted as a function of the chronological course of the picture signal of the corresponding pixel and/or as a function of the picture signals of pixels bordering it three-dimensionally.

At program point 140, coherent regions of the change mask are characterized with an identification code and recognized as objects. The outcome is a pixel-precise object mask of the current picture. In the pixel-precise object mask of the current picture, the pixels of the individual objects are characterized with an object-specific gray value that is characteristic for the corresponding object and that identifies it unambiguously and in such a way that it can be distinguished from other objects. The number of coherent regions is the object number of the current picture. For each object characterized by a characteristic gray value in the pixel-precise object mask of the current picture, the object status "moved object" is stored in memory in a data structure.

At program point 150, the object size is ascertained for all the objects of the current picture that have been characterized in accordance with the pixel-precise object mask. The object size is the direct product of the number of pixels that belong to a coherent region. All the objects that are smaller than a predetermined second size threshold are provided with the object status "no moved object" in the data structure. All the other objects are provided with the object status "moved object". The predetermined second size threshold is adapted here to the position of the corresponding object in the current picture and thus it possible to evaluate the scene in terms of perspective. The method employed for this purpose is described in German Patent Application P 44 40 671, which was not yet published by the priority date of the present application.

At program point 160, for all the objects that have the object status of "moved object" in the data structure, a deviation in the texture in the object region of the current picture from the recursively ascertained texture of the scene without objects is determined. To that end, for those picture blocks that belong to the object, the weighted sum $s_a$ of the squares of the deviation in the current texture from the chronological average value of the texture, and the weighted sum $s_v$ of the chronological variance in the texture, are determined and entered into the data structure. Next, the object-oriented textural change ratio $r_{tobj}$ between the sum of the squared deviations $s_a$ and the sum of the chronological variances $s_v$ ascertained is likewise entered into the data structure for the corresponding objects. The object-oriented textural change ratio $r_{tobj}$ is a measure for the deviation of the texture in the object region from the texture in that region without an object. The weighting of the picture blocks is done as a function of their proportionate surface area of the corresponding object.

At program point 170 shown in FIG. 4, the question is asked whether objects are located in the two-dimensional list of the monitored objects. If not, the method continues at program point 220, and if so then it continues at program point 180.

Figure 5:
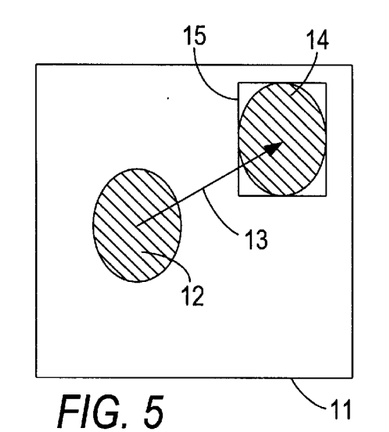
FIG. 5 shows an object mask with object displacement.
Figure 6:
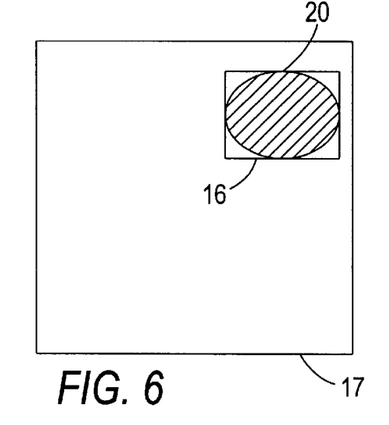
FIG. 6 shows an object mask ascertained by pixel-precise detection of change.
Figure 7:
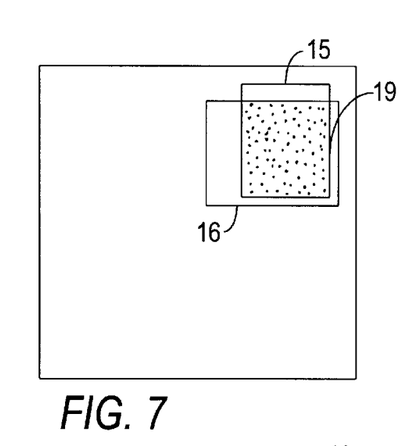
FIG. 7 shows a superposition of circumscribing rectangles.
Figure 8:
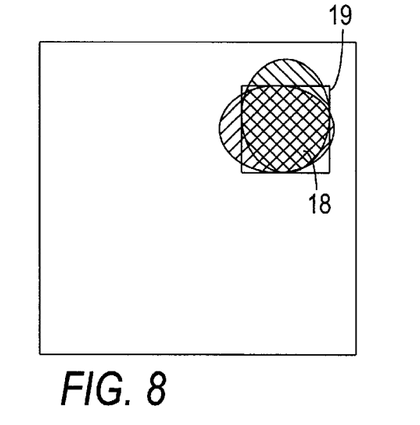
FIG. 8 shows a pixel-precise overlapping surface area of superimposed circumscribing rectangles.

At program point 180, an association of objects from the two-dimensional list of monitored objects is made with the objects of the current picture. For all the objects in the two-dimensional list of the monitored objects, whose precise position is described in the object mask of the previously used current picture, an association with the objects of the current picture, whose precise position is described in the pixel-precise object mask of the current picture, is made. In FIG. 5, the object mask 11 of the previously used current picture is shown. It includes the mask 12 of an object. The mask 12 belonging to the object, in the object mask 11 of the previously used current picture, is now displaced by the motion vector, ascertained for the object in program step 80, that is characterized by reference numeral 13 in FIG. 5. As a result, a displaced mask 14 of the object is attained. Next, the question is asked whether there is any local overlap with objects of the pixel-precise object mask of the current picture that have the status of "moved object" in the data structure. To that end, for the mask 14 of the displaced object a circumscribing rectangle 15 is formed. In accordance with FIG. 6, which shows the pixel-precise object mask 17 of the current picture, the object 20 shown there is also provided with a circumscribing rectangle 16. Then, for all the objects in the pixel-precise object mask of the current picture that have the status "moved object" stored in the data structure, the question is asked whether there is any overlap of the circumscribing rectangles 15 and 16. If there is an overlap, then an overlapping rectangle 19 is ascertained in accordance with FIG. 7, and within this overlapping rectangle 19 a pixel-precise overlap area 18 is determined in accordance with FIG. 8. This pixel-precise overlap area 18 is located inside the overlapping rectangle 19. In the pixel-precise object mask of the current picture, there may be a plurality of objects having the status of "moved object". An association with the object with which the pixel-precise overlap area is maximal takes place. The associated object in the pixel-precise object mask of the current picture then receives the status of "already tracked object" and this status is entered into the data structure. The properties of the object are then entered into the two-dimensional list of monitored objects. If there is no overlap with one of the objects in the pixel-precise object mask of the current picture, then this is likewise entered into the two-dimensional list of monitored objects. Such an event can mean for instance that the object has left the scene or is covered by an obstruction.

At program point 190, an evaluation of all the objects in the two-dimensional list of monitored objects is done. To that end, for each of these objects, two new characteristics are ascertained. First, a total motion vector v as a vectorial sum of the motion vectors ascertained, and second a mean chronological object-oriented textural change. To ascertain the mean chronological object-oriented textural change, the weighted sums, ascertained in the object-oriented analysis, of the square deviations in the textures of the picture blocks that have at least part of the object, from the chronological mean value of the texture, which deviations have been found in the block-oriented analysis, are added together in object-oriented fashion over time and divided by the chronological sum of the sums, also ascertained in the block-oriented analysis and weighted in the same way, of the chronological variance in the texture. The resultant quotient $r_{tges}$ is compared with a predetermined fourth threshold. If the quotient $r_{tges}$ is below this threshold, then the object is deleted from the two-dimensional list of monitored objects. Next, the amount of the total motion vector v is compared with a predetermined second threshold. If the amount is below this threshold, then the object is deleted from the two-dimensional list of monitored objects. If the object is greater than this predetermined second threshold or is identical to it, then, in the event that it was not possible to ascertain a motion vector for the object in the preceding motion estimation at program point 80, or no adjoining object for that object was found, a moved object is recognized and the object is deleted from the two-dimensional list, since further tracking of the moved object is not assured. As a result, for instance, objects that have left the scene or that because of their motion are now concealed by an obstruction are detected as being in motion. If the amount of the total motion vector v is above a predetermined third threshold, then a moved object is detected, and the object is optionally deleted from the two-dimensional list or is left in the two-dimensional list for further tracking.

At program point 200, the question is asked whether at program point 190, moved objects in the two-dimensional list of monitored objects were detected. If so, then at program point 210 an object alarm is tripped and a jump is made to program point 220; if not, the method is continued at program point 220 without tripping an object alarm. At program point 220, for those objects in the pixel-precise object mask of the current picture that have the status of "moved object" in the data structure, the textural deviation ascertained in program point 160 is compared with an object-oriented textural change threshold $t_{tobj}$. If the textural deviation is below this threshold, then the object is given the status "no moved object" in the data structure.

At program point 230, for those objects in the pixel-precise object mask of the current picture that have the status of "moved object" in the data structure, an object-oriented picture signal change is ascertained. To that end, for those picture blocks that belong to the object, both the chronological mean values of the picture signal changes and the current picture signal changes are added together. The quotient of the two sums is the object-oriented picture signal change ratio $r_{sobj}$ and is a measure for the significance of the picture signal change caused by the object. The picture blocks are weighted as a function of their proportionate area in the object.

At program point 240, for all the objects having the status "moved object", the object-oriented picture signal change ratio $r_{sobj}$, ascertained at program point 230, is compared with an object-oriented picture signal change threshold $t_{sobj}$. If the object-oriented picture signal change ratio $r_{sobj}$ is below this threshold, then the object is given the status of "no moved object" in the data structure.

At program point 250, for all the objects having the status "moved object" stored in the data structure and that in terms of their object size, ascertained at program point 150, are below a predetermined first size threshold, an object-oriented motion estimation is performed. The first size threshold is selected such that objects whose size is above this threshold have such a large proportional area of the total picture that a meaningful motion estimate is no longer possible. In the object-oriented motion estimation, based on the current picture, the motion with respect to the first reference picture is estimated for all the objects of the pixel-precise object mask of the current picture that have the status of "moved object" stored in the data structure. The method employed for this, as already described, ascertains a quality criterion for each possible motion vector within a search range and assesses the motion vector that best meets the quality criterion relative to the other possible motion vectors. If the quality criterion for the motion vector having the best-met quality criterion is fulfilled markedly better than for all the other possible motion vectors, then a reliable estimate is available. Otherwise, the estimate must be considered unreliable. The method, also already described above, is described for instance in the publication by R. Mester and M. Hötter entitled "Zuverlässigkeit und Effizienz von Verfahren zur Verschiebungsvektorschätzung" [Reliability and Efficiency of Methods for Displacement Vector Estimation], 1995 Annual Meeting in Bielefeld, of the Deutsche Arbeitsgemeinschaft für Mustererkennung [German Association for Pattern Recognition]. If the motion vector for an object cannot be ascertained reliably, then the object is given the status "uncertain object". If the motion vector can be ascertained reliably, then its amount is first compared with the predetermined second threshold. If the amount is below the predetermined second threshold, then the object is given the status "object with slight motion". The status, whatever it is, is again stored in the data structure. If the amount of the motion vector is above the predetermined second threshold, then it is compared with the predetermined third threshold. If the amount of the motion vector is less than this predetermined third threshold, then the object is given the status "object to be tracked" and is entered in the two-dimensional list of monitored objects. If the amount of the motion vector is above the third predetermined threshold, then the object is detected as a moved object. It is then given the status "moved object". The applicable status is again entered into the data structure.

At program point 270, the question is asked whether there are objects in the current picture that have the status of "moved object" in the data structure. If so, then an object alarm is tripped at program point 280. Objects from the two-dimensional list of monitored objects for which an object alarm has been tripped can either be deleted from the two-dimensional list or left in the two-dimensional list for further tracking.

At program point 290, the block-precise status mask is adapted in accordance with the results of the object-oriented analysis. To that end, first the value "no moved object" is written into all the picture blocks. Then, for all the objects, the associated status is entered from the data structure into the picture blocks touched by the object. Since one picture block may be touched by a plurality of objects, the ascertainment of the status takes place in a fixed order, so that a more-important status in each case overwrites a less-important status. The order of the status with increasing importance is as follows: "object with slight motion", "uncertain object", "already tracked object", "object to be tracked", "moved object". For objects, detected as being in motion, from the two-dimensional list of monitored objects that have not been deleted from the two-dimensional list, an alarm is tripped again if further motion is detected, so that it is understood that if an object detected as being in motion is tracked further, an object alarm may be tripped repeatedly under some circumstances.

At program point 300, if at least one object is entered in the two-dimensional list of monitored objects, the pixel-precise object mask of the current picture is copied onto the object mask of the current picture used before, and this mask thus represents a pixel-precise object mask, and the current picture is copied into the third reference picture.

At program point 310, if no objects have been entered in the two-dimensional list of monitored objects and all the objects on the current picture have the status "no moved object" in the data structure, the first reference picture is stored in memory as the new second reference picture.

At program point 320, the statistics in the form of the mean value and variance of the block-oriented picture signal change and texture are tracked as a function of the block-precise status mask. To that end, first-order IIR filters are used. The recursion factor r for these filters is adjusted as a function of the block-precise status mask. In picture regions in which the analysis has detected moved objects or possible moved objects, a low recursion factor r is set, for instance. In the other picture regions, a medium-size recursion factor r is set, so that by means of the tracking a slow change in the scene is taken into account, of the kind that occurs for instance at the transition from day to night.

At program point 330, all the picture regions for which the status "objects with slight motion" has been entered in the block-precise status mask, are copied from the first reference picture into a buffer memory.

At program point 340, the question is asked whether there is at least one object with the status "moved object" or "uncertain object" stored in the data structure. If not, then at program point 350 the first reference picture is overwritten with the current picture, and next the current picture is overwritten with a new video picture from the picture-taking unit 1. If there is at least one object with the status "moved object" or "uncertain object" in the data structure, then at program point 360 the first reference picture and the current picture are overwritten with new video pictures from the picture-taking unit 1. In this way, the picture-taking frequency is increased, so that even rapidly moving objects can be detected. The method then continues at program point 370.

At program point 370, all the picture regions for which the status "object with slight motion" has been entered in the block-precise status mask are copied from the buffer memory into the first reference picture. By proceeding in this way, very slight motions, which are cumulative, can be detected.

The method continues at program point 20.

In addition or as an alternative to the object size ascertained at program point 150, a shape characteristic can also be determined, so that objects whose shapes do not meet predetermined requirements will not be detected as moved objects, and to avoid an object-oriented comparison of their picture signals in order to economize on computation effort. As an example of a shape characteristic, the linearity as the coherent regions can for instance be ascertained. To ascertain the linearity, the maximum length e of the corresponding object is ascertained. To that end, the pixels of a coherent region that have a maximum spacing from one another are ascertained. As the measurement variable for the linearity, the square of the maximum spacing, referred to the surface area of the object, is used: linearity=$e^2$:A; e stands for the maximum spacing between two pixels of the object, and A stands for the number of pixels in the object. Objects whose linearity is above a predetermined linearity threshold, as is the case for tree branches, for instance, are not examined further and are given the status "no moved object" in the data structure.

We claim:

1. A method for detecting moved objects in chronologically successive pictures, wherein for block-oriented analysis a current picture is divided into picture blocks, for each picture block one picture signal of the current picture is compared with a picture signal of a corresponding picture block of a first reference picture that precedes the current picture in the chronological succession of pictures, in that in particular a picture signal change and/or a textural change is ascertained, characterized in that for detecting a change, the difference between the picture signals of the current picture and the picture signals of a second reference picture without moved objects is compared pixel-precisely with a predetermined first threshold; that if the predetermined first threshold is exceeded, then in an object-oriented analysis the size and/or shape of an object is ascertained and the picture signals that represent the moved object are compared with the picture signals of the corresponding picture region of the first reference picture, in particular by ascertaining a picture signal change and/or a textural change; that for at least one moved object of the current picture that undershoots a predetermined first size threshold, a motion estimate is made by association with a corresponding picture region of the first reference picture and formation of an associated motion vector; that if a predetermined second threshold is exceeded by the amount of the estimated motion vector, the object is delivered for chronological monitoring; and that if a predetermined third threshold is exceeded by the amount of the estimated motion vector, the object is detected as a moved object.

2. The method as defined in claim 1, wherein for at least one chronologically monitored object, a motion estimate is performed, on the basis of a third reference picture that corresponds to a previously used current picture, forming an associated motion vector and with corresponding prediction of a new object position for the current picture; that in the pixel-precise detection of change, the difference between the picture signals at the predicted object position of the current picture and the corresponding picture signals of the second reference picture are compared pixel-precise with the predetermined first threshold; that if the predetermined first threshold is exceeded, then with an object-oriented analysis the size and/or shape of an object is ascertained and the picture signals that represent the monitored object are compared, in an object-oriented way, with the picture signals of the corresponding picture region of the first reference picture by ascertaining the textural change; that an association of the monitored object with the object of the current picture is carried out in the current picture by superimposing on the object position predicted by the motion estimate a corresponding object position ascertained in the object-oriented analysis; that the motion of the monitored object is ascertained as a function of time by adding together motion vectors thus far; and that if the predetermined third threshold is exceeded by the amount of the added-together motion vector, the monitored object is detected as a moved object.

3. The method as defined in claim 1 or 2, wherein the object-oriented analysis is performed only in those picture regions in which moved objects have been found by the block-oriented analysis and/or in which the motion estimate is performed for at least one chronologically monitored object.

4. The method as defined in claim 1, wherein for the monitored object, the mean object-oriented textural change over time is ascertained, and, if a predetermined fourth threshold for the mean object-oriented textural change over time is undershot, the monitoring of the object is discontinued.

5. The method as defined in claim 4, wherein to ascertain the mean object-oriented textural change over time, quadratic deviations of textures of the picture blocks that include at least part of the object from a chronological mean value of the textures are ascertained in the block-oriented analysis and are added together, weighted to form weighted sums, the weight of the summand being selected to be proportional to the surface area of the picture block by which the picture block covers the object; and the weighted sums are added together in object-oriented fashion over time and are divided by the chronological sum of weighted sums of the chronological variance of the textures also ascertained in the block-oriented analysis.

6. The method as defined in claim 2, wherein, if the predetermined second threshold is undershot by the amount of the added-together motion vector of the monitored object, the monitoring of the monitored object is discontinued.

7. The method as defined in claim 2, wherein, if the predetermined second threshold is exceeded by the amount of the added-together motion vector of the monitored object, the monitored object is detected as a moved object, in the event that in the most recently performed motion estimation it was not possible to ascertain a reliable motion vector.

8. The method as defined in claim 2, wherein, if the predetermined second threshold is exceeded by the amount of the added-together motion vector of the monitored object, the monitored object is detected as a moved object, in the event that no association of the monitored object with an object in the current picture is possible.

9. The method as defined in claims 1 or 2, wherein objects whose size is below a predetermined second size threshold and objects whose shapes do not meet predetermined requirements are not detected as moved objects, and an object-oriented comparison of their picture signals is not performed.

10. The method as defined in claims 1 or 2, wherein further comprising tripping an object alarm for moved objects that are detected.

11. The method as defined in claims 1 or 2, further comprising discontinuing existing monitoring of moved objects that are detected.

12. The method as defined in claims 1 or 2, wherein, for the motion estimate within a predetermined search range for possible estimated motion vectors, a quality criterion for each of the possible estimated motion vectors is ascertained; the motion estimate is evaluated as reliable if the estimated motion vector having the best quality criterion has a markedly better quality criterion than the other possible estimated motion vectors; and the motion estimate is otherwise evaluated as unreliable.

13. The method as defined in claim 1, wherein object motion is ascertained by means of a displacement in the pixels contained in an object mask.

14. The method as defined in claim 13, wherein the object mask is obtained by means of the pixel-precise detection of change, and every coherent picture region detected as having changed is characterized with an identification code.

15. The method as defined in claim 2, wherein object motion is ascertained by means of a displacement in the pixels contained in an object mask; for finding an association of the monitored object with an object of the current picture, the object mask of the previously used current picture is superimposed on the object mask of the current picture, taking into account the predicted object motion, and for an unambiguous association circumscribing rectangles of the corresponding objects must overlap.

16. The method as defined in claim 1, wherein the size of the moved object is ascertained in weighted fashion as a function of the picture position.

17. The method as defined in claim 1, wherein the first reference picture is copied into the second reference picture if no object is being monitored and all the objects in the current picture are detected as nonmoving objects.

18. The method as defined in claim 1, wherein the picture blocks having objects that are executing a slight motion are copied out of the first reference picture into a buffer memory, and after a change in the first reference picture the picture blocks having the objects with slight motion are copied back out of the buffer memory again into the first reference picture.

19. The method as defined in claim 1, wherein the first reference picture is overwritten with the current picture if no moved object or object characterized by an unreliable motion estimate is present; and otherwise the first reference picture is overwritten with a subsequent current picture.

* * * * *